(12) United States Patent
Eckstein et al.

(10) Patent No.: US 12,276,394 B2
(45) Date of Patent: Apr. 15, 2025

(54) HOMOGENEOUS REAR COMBINATION LAMP WITHOUT OUTER LENS

(71) Applicant: Atieva, Inc., Newark, CA (US)

(72) Inventors: Hans-Christoph Eckstein, Woodside, CA (US); Lingxuan Zhu, Fremont, CA (US); Jaime Ivan Calderon Gonzalez, San Francisco, CA (US)

(73) Assignee: Atieva, Inc., Newark, CA (US)

( * ) Notice: Subject to any disclaimer, the term of this patent is extended or adjusted under 35 U.S.C. 154(b) by 0 days.

(21) Appl. No.: 18/508,467

(22) Filed: Nov. 14, 2023

(65) Prior Publication Data

US 2024/0159377 A1    May 16, 2024

Related U.S. Application Data

(60) Provisional application No. 63/383,582, filed on Nov. 14, 2022.

(51) Int. Cl.
*F21S 43/27*    (2018.01)
*B60Q 1/26*    (2006.01)
(Continued)

(52) U.S. Cl.
CPC ............ *F21S 43/27* (2018.01); *B60Q 1/2607* (2013.01); *F21S 43/14* (2018.01); *F21S 43/239* (2018.01);
(Continued)

(58) Field of Classification Search
CPC ....... F21S 43/243; F21S 43/251; F21S 43/253
See application file for complete search history.

(56) References Cited

U.S. PATENT DOCUMENTS

| 7,325,952 B2 | 2/2008 | Wakamatsu et al. |
| 9,187,031 B1 | 11/2015 | Ovenshire et al. |

(Continued)

FOREIGN PATENT DOCUMENTS

| EP | 2816276 A2 | 12/2014 | |
| EP | 3453947 A1 * | 3/2019 | ............... B60Q 1/04 |

(Continued)

OTHER PUBLICATIONS

International Search Report and Written Opinion for PCT Application No. PCT/US2023/079593, mailed on Jan. 31, 2024, 16 pages.

*Primary Examiner* — Alexander K Garlen
(74) *Attorney, Agent, or Firm* — Brake Hughes Bellermann LLP

(57) ABSTRACT

A rear combination lamp for a vehicle comprises: a first housing member that is opaque; a first light source inside the first housing member; a first lightguide abutting the first housing member and enclosing the first light source, a first taillight portion extending from the first lightguide; a structural member that is opaque and abuts the first lightguide on an opposite side from the first housing member; a second lightguide abutting the structural member on an opposite side from the first lightguide, a second taillight portion extending from the second lightguide; a second housing member that is opaque and that abuts the second lightguide on an opposite side from the structural member; and a second light source inside the second housing member, wherein the second lightguide encloses the second light source.

20 Claims, 2 Drawing Sheets

(51) Int. Cl.
*F21S 43/14* (2018.01)
*F21S 43/235* (2018.01)
*F21S 43/239* (2018.01)
*F21S 43/241* (2018.01)
*F21S 43/243* (2018.01)
*F21S 43/247* (2018.01)
*F21S 43/50* (2018.01)
*F21S 45/50* (2018.01)
*F21W 103/10* (2018.01)
*F21W 103/20* (2018.01)
*F21W 103/35* (2018.01)
*F21Y 115/10* (2016.01)

(52) U.S. Cl.
CPC ........... *F21S 43/241* (2018.01); *F21S 43/243* (2018.01); *F21S 43/247* (2018.01); *F21S 43/253* (2024.05); *F21S 43/51* (2018.01); *F21S 45/50* (2018.01); *F21W 2103/10* (2018.01); *F21W 2103/20* (2018.01); *F21W 2103/35* (2018.01); *F21Y 2115/10* (2016.08)

(56) References Cited

U.S. PATENT DOCUMENTS

| | | |
|---|---|---|
| 9,200,775 B2 | 12/2015 | Eckhardt et al. |
| 9,696,002 B2 | 7/2017 | Ohashi et al. |
| 10,443,833 B2 | 10/2019 | Tsuchiya et al. |
| 11,046,239 B1 | 6/2021 | Lepage et al. |
| 2014/0160779 A1* | 6/2014 | Pusch .................... F21S 43/50 362/511 |
| 2022/0163178 A1* | 5/2022 | Di Sopra ............ B29C 65/1635 |

FOREIGN PATENT DOCUMENTS

| | | | | |
|---|---|---|---|---|
| EP | 3543598 A1 | | 9/2019 | |
| FR | 3031794 A1 | * | 7/2016 | |
| JP | 2012199155 A | | 10/2012 | |
| JP | 2015037034 A | * | 2/2015 | .......... F21S 48/2293 |
| JP | 2018198134 A | | 12/2018 | |
| WO | WO-2015011377 A1 | * | 1/2015 | ............... B60Q 1/04 |
| WO | 2015071620 A1 | | 5/2015 | |
| WO | 2018073678 A1 | | 4/2018 | |
| WO | WO-2024107694 A1 | * | 5/2024 | .......... B60Q 1/2607 |

* cited by examiner

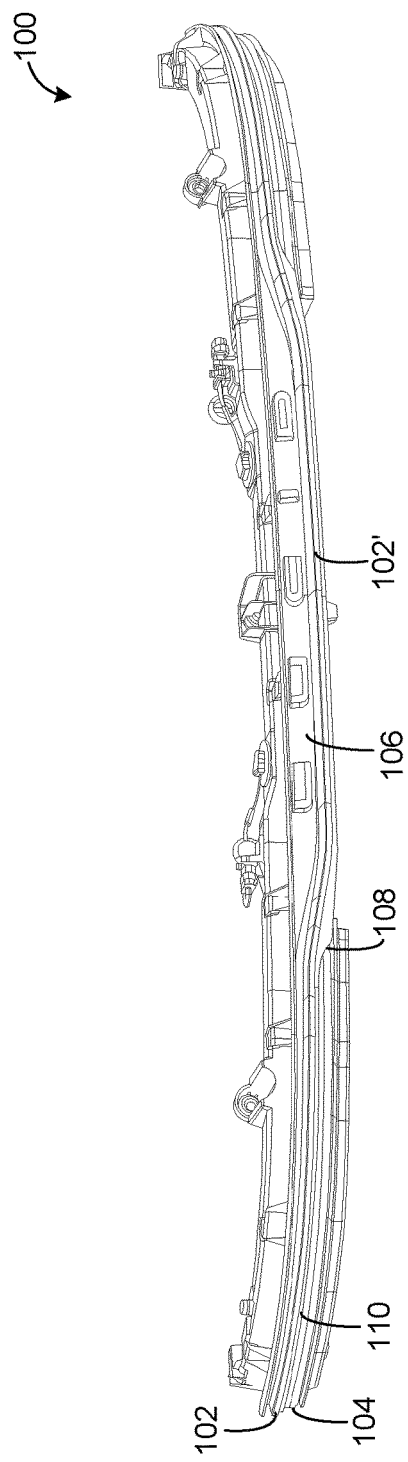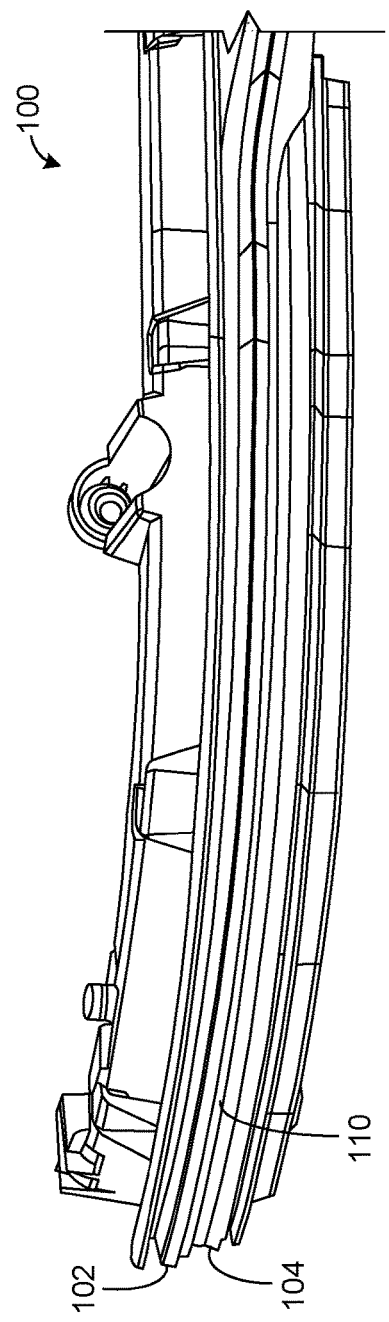

HOMOGENEOUS REAR COMBINATION LAMP WITHOUT OUTER LENS

CROSS-REFERENCE TO RELATED APPLICATION

This application claims benefit, under 35 U.S.C. § 119, of U.S. Provisional Patent Application No. 63/383,582, filed on Nov. 14, 2022, entitled "HOMOGENEOUS REAR COMBINATION LAMP WITHOUT OUTER LENS", the disclosure of which is incorporated by reference herein in its entirety.

TECHNICAL FIELD

This document relates to a homogeneous rear combination lamp without an outer lens.

BACKGROUND

Some attempts have been made in the past to design vehicle taillights that combine two or more light signaling functions, sometimes called rear combination lamps. In the earliest designs, incandescent light bulbs were placed in a housing with a reflector, and covered by one or more outer lenses to protect the bulbs against water and damage, and also to control the flow of light. More recent designs have made use of semiconductor devices, typically at least one light-emitting diode (LED) powered by a circuit board. However, these later approaches have maintained the reliance on an outer lens for the combination lamp, inside of which have been placed optical parts such as lightguides. Also, past approaches may predominantly have been based on design principles that involve assembly of components essentially in the direction of a horizontal axis (e.g., optical lens-lightguide-LED/circuit board-housing).

SUMMARY

In an aspect, a rear combination lamp for a vehicle comprises: a first housing member that is opaque; a first light source inside the first housing member; a first lightguide abutting the first housing member and enclosing the first light source, a first taillight portion extending from the first lightguide; a structural member that is opaque and abuts the first lightguide on an opposite side from the first housing member; a second lightguide abutting the structural member on an opposite side from the first lightguide, a second taillight portion extending from the second lightguide; a second housing member that is opaque and that abuts the second lightguide on an opposite side from the structural member; and a second light source inside the second housing member, wherein the second lightguide encloses the second light source.

Implementations can include any or all of the following features. Each of the first and second taillight portions extends rearward on the vehicle from the first and second housing members. The first housing member, the first light source, the first lightguide, the structural member, the second lightguide, the second light source, and the second housing member are assembled substantially along a z-direction of a vehicle coordinate system. The rear combination lamp forms a stack of components having a rearward joint and a forward joint. The rearward joint comprises the first housing member, the first lightguide, the structural member, the second lightguide, and the second housing member forming a first seal. The forward joint comprises the first housing member, the first lightguide, the structural member, the second lightguide, and the second housing member forming a second seal. The first lightguide includes an elevated portion adjacent the first light source. The structural member includes a shape supporting the elevated portion. The elevated portion comprises a light collimator. The first lightguide further includes an outer surface forming about a 45-degree angle with the first light source and with the first taillight portion. The second lightguide includes an elevated portion adjacent the second light source. The second lightguide further includes an outer surface forming about a 45-degree angle with the second light source and with the second taillight portion. The second lightguide further includes a portion extending from the elevated portion in an opposite direction from the second taillight portion, the portion being thinner than the elevated portion and the second taillight portion. Each of the first and second light sources includes a light-emitting diode. The rear combination lamp is a full-size taillight extending from side to side of the vehicle. The first lightguide extends along an entire length of the full-size taillight. The first lightguide is a taillight and a brake light for the vehicle. The second lightguide extends along only part of the entire length of the full-size taillight. The second lightguide is a turn signal light for the vehicle. At a rear of the vehicle, only the first and second taillight portions, and a portion of the structural member, extend past vehicle trim, wherein the portion of the structural member is positioned between the first and second taillight portions.

BRIEF DESCRIPTION OF DRAWINGS

FIG. 1 shows an example of a rear combination lamp for a vehicle.

FIG. 2 shows an enlargement of a portion of the rear combination lamp of FIG. 1.

Like reference symbols in the various drawings indicate like elements.

DETAILED DESCRIPTION

Figure 3:
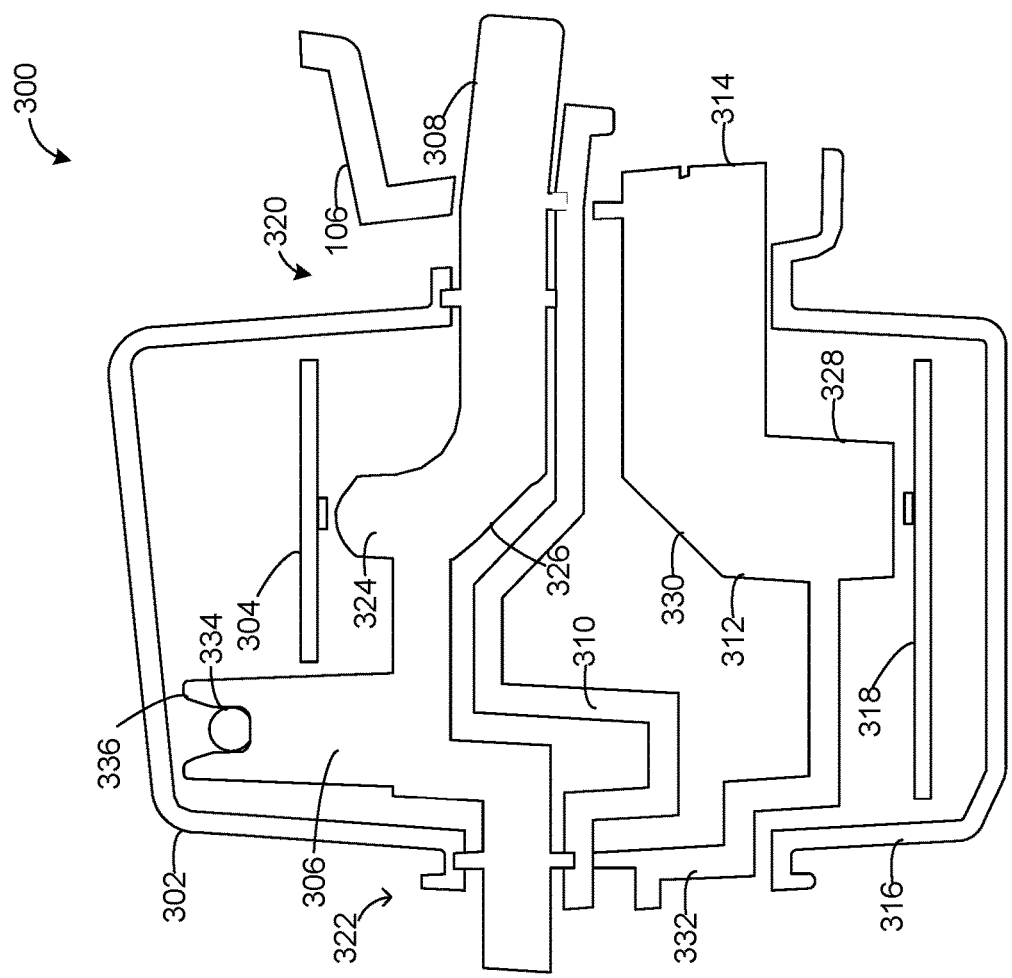
FIG. 3 shows an example cross section of a rear combination lamp.

This document describes examples of systems and techniques for a homogeneous rear combination lamp without an outer lens for a vehicle. The rear combination lamp can have lightguides exposed to the ambient (e.g., at a trunk lid or liftgate of the vehicle) that are not covered by an outer lens, with a remainder of the lamp assembly covered by trim. A homogeneous rear combination lamp can be designed as essentially a stack of components assembled substantially along a z-direction of a vehicle coordinate system while ensuring that the lightguides are oriented in the proper direction when installed.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle, or the vehicle can be unpowered (e.g., when a trailer is attached to another vehicle). The vehicle can include a passenger compartment accommodating one or more persons.

Examples described herein refer to a top, bottom, front, side, or rear. These and similar expressions identify things or aspects in a relative way based on an express or arbitrary notion of perspective. That is, these terms are illustrative only, used for purposes of explanation, and do not necessarily indicate the only possible position, direction, and so on.

FIG. 1 shows an example of a rear combination lamp 100 for a vehicle. FIG. 2 shows an enlargement of a portion of the rear combination lamp 100 of FIG. 1. The rear combination lamp 100 can be used with one or more other examples described elsewhere herein. The rear combination lamp 100 eliminates the use of an outer lens and can be positioned at a rear end of a vehicle, such as on a liftgate, trunk lid, bumper, or fascia. The rear combination lamp 100 is here shown with exemplary portions of trim or other structures for illustrative purposes. In some implementations, the rear combination lamp 100 is a full-size taillight extending from side to side of the vehicle. For example, the vehicle can have a clamshell trunk lid design and the rear combination lamp 100 can be part of a wraparound taillight fixture on the trunk lid. In some implementations, the rear combination lamp 100 can be configured to also serve as a handle for a liftgate or a trunk lid, and/or to house additional illumination (not shown) for a license plate. To name just a few examples, the vehicle can be a sport utility vehicle, a sedan, a multi-purpose vehicle, a crossover vehicle, a minivan, or a pick-up truck.

The rear combination lamp 100 includes a taillight portion 102 that extends along substantially an entire length of the rear combination lamp 100, and a taillight portion 104 that extends along only part of the entire length of the rear combination lamp 100. Each of the taillight portions 102 and 104 eliminates the use of an outer lens and can be part of a respective lightguide of the rear combination lamp 100, for example as illustrated below. In one or more parts along the length of the rear combination lamp 100 where the taillight portion 104 does not extend, the place of the taillight portion 104 can instead be occupied by a part 102' of the taillight portion 102 and/or by vehicle trim 106 of the vehicle. For example, the vehicle trim 106 is mounted to a trunk lid, liftgate or other part of the body, and can be adorned with badging, emblems, and/or design features.

Each of the taillight portions 102 and 104 can be used for one or more functions of light signaling. In some implementations, the taillight portion 102 is a taillight and a brake light for the vehicle. For example, the taillight can be illuminated whenever the vehicle is on (unless specifically switched off), while the brake light (e.g., a different intensity of illumination) is activated while the vehicle is being braked actively or passively. In some implementations, the taillight portion 104 is a turn signal light for the vehicle. For example, the taillight portion 104 can extend from the end of the rear combination lamp 100 to a point 108, at each half of the rear combination lamp 100. Either side of the taillight portion 104 can then be caused to blink for signaling a turn.

The rear combination lamp 100 can include a structural member 110 positioned between the taillight portions 102 and 104. The structural member 110 can serve as support to provide strength and stiffness, and/or to insulate against light leakage between the taillight portions 102 and 104 inside the rear combination lamp 100. As such, at a rear of the vehicle, the taillight portions 102 and 104, and the structural member 110, may be the only components of the rear combination lamp 100 that extend past the vehicle trim 106.

FIG. 3 shows an example cross section of a rear combination lamp 300. The rear combination lamp 300 can be used with one or more other examples described elsewhere herein. For example, the rear combination lamp 100 in FIGS. 1-2 can be similar or identical to the rear combination lamp 300. The rear combination lamp 300 is here described with reference to a vehicle coordinate system that includes respective x, y, z-axes. For example, the positive x-direction can correspond to the direction from the vehicle front wheel to the rear wheel; the positive y-direction can correspond to a lateral direction perpendicular to the x-direction (e.g., from the driver toward the front seat passenger); and the z-direction can correspond to a vertical direction (e.g., with a positive direction being upward, and a negative direction being downward with reference to the vehicle). The cross section is taken in the x, z-plane, meaning that the illustration looks along the y-direction across the width of the vehicle. For example, the left side of the illustration can face forward in the vehicle and the right side of the illustration can face rearward. To clarify the shapes of the exemplified structures, some components of the rear combination lamp 300 are shown somewhat separated from each other for purposes of illustration only.

One advantage of the rear combination lamp 300 is that is has a design that facilitates assembly substantially along the z-direction. In some implementations, the assembly can be performed along, or close to, the z-direction according to some measure of tolerance. For example, the tolerance can be +/− about 15 degrees along the z-direction. This contrasts with previous approaches of lamp design where the lamp was assembled largely in the x-direction, particularly so that an outer lens was the outermost (i.e., rearmost) component of such a stack of components. The rear combination lamp 300, on the other hand, does not have an outer lens and is instead assembled substantially in the z-direction.

The rear combination lamp 300 can include a housing member 302 that is opaque. For example, the housing member 302 can be made of metal or a composite such as a polymer material. The rear combination lamp 300 can include a light source 304 inside the housing member 302. For example, the light source 304 can include at least one LED positioned on a circuit board (e.g., a printed circuit board). The rear combination lamp 300 can include a lightguide 306 abutting the housing member 302 and enclosing the light source 304. For example, the housing member 302 can form a cavity in which the light source 304 is positioned, and the lightguide 306 can at least partially cover such cavity. The lightguide 306 can include any material that allows the lightguide 306 to guide electromagnetic waves of at least visible light from the light source 304, including but not limited to a polymer material such as a plastic material, and/or silicon material, and/or glass. The lightguide 306 has a taillight portion 308 extending therefrom. The taillight portion 308 is one of the areas where the rear combination lamp 300 emits light visible outside the vehicle (e.g., the light oriented substantially rearward from the vehicle). The taillight portion 102 in FIGS. 1-2 can include the taillight portion 308. The rear combination lamp 300 can include a structural member 310 that is opaque and abuts the lightguide 306 on an opposite side from the housing member 302. For example, the structural member 310 can extend essentially along the lightguide 306. The structural member 310 can be made of metal or a composite such as a polymer material. The rear combination lamp 300 can include a lightguide 312 abutting the structural member 310 on an opposite side from the lightguide 306. The lightguide 312 can be made from the same material as, or a different lightguide material than, the lightguide 306. The lightguide 312 has a taillight portion 314 extending therefrom. The taillight portion 314 is another one of the areas where the rear combination lamp 300 emits light visible outside the vehicle. The taillight portion 104 in FIGS. 1-2 can include the taillight portion 314. The rear combination lamp 300 can include a housing member 316 that is opaque and that abuts the lightguide 312 on an opposite side from the structural member 310. The housing member 316 can be made from the same material as, or a different opaque material than, the housing member 302. The rear combination lamp 300 can include a light source 318 inside the housing member 316. For example, the light source 318 can include at least one LED positioned on a circuit board (e.g., a printed circuit board). The housing member 316 can form a cavity in which the light source 318 is positioned, and the lightguide 312 can at least partially cover such cavity.

The above example illustrates that each of the taillight portions 308 and 314 can extend rearward on the vehicle from the housing members 302 and 316. That is, the rear combination lamp 300 does not have any outer lens covering the taillight portions 308 and 314 or protecting against ingress of moisture or dust. Rather, the taillight portions 308 and 314, each of which extends from a position adjacent a corresponding light source (e.g., LEDs) in the interior, itself forms part of the outwardly visible light-emitting components, and the exterior surface of the rear combination lamp 300, when the rear combination lamp 300 is installed on the vehicle.

The above example illustrates that the housing member 302, the light source 304, the lightguide 306, the structural member 310, the lightguide 312, the light source 318, and the housing member 316 can be assembled substantially along a z-direction of a vehicle coordinate system.

The above example illustrates that the rear combination lamp 300 can form a stack of components having a rearward joint 320 and a forward joint 322. The rearward joint 320 can include the housing member 302, the lightguide 306, the structural member 310, the lightguide 312, and the housing member 316 forming a seal (e.g., water or dust does not enter the interior of the rear combination lamp 300 because the rearward joint 320 does not have any opening). The forward joint 322 can include the housing member 302, the lightguide 306, the structural member 310, the lightguide 312, and the housing member 316 forming a seal (e.g., water or dust does not enter the interior of the rear combination lamp 300 because the forward joint 322 does not have any opening).

The lightguide 306 can have an elevated portion 324 adjacent the light source 304. In some implementations, the elevated portion 324 can help collect the light from the light source 304 and guide it toward the taillight portion 308. For example, the elevated portion 324 can include a light collimator (e.g., a partially spherical or otherwise rounded shape). The structural member 310 can include a shape supporting the elevated portion 324. The lightguide 306 can have an outer surface 326 forming about a 45-degree angle with the light source 304 and with the taillight portion 308. For example, the outer surface 326 can reflect light from the light source 304 and guide it toward the taillight portion 308 by way of total internal reflection.

The lightguide 312 can have an elevated portion 328 adjacent the light source 318. In some implementations, the elevated portion 328 can help collect the light from the light source 318 and guide it toward the taillight portion 314. The lightguide 312 can have an outer surface 330 forming about a 45-degree angle with the light source 318 and with the taillight portion 314. For example, the outer surface 330 can reflect light from the light source 318 and guide it toward the taillight portion 314 by way of total internal reflection.

The lightguide 312 can have a portion 332 extending from the elevated portion 328 in an opposite direction from the taillight portion 314. For example, the portion 332 can be included in the forward joint 322. The portion 332 can be thinner than the elevated portion 328 and the taillight portion 314. For example, a thinner material dimension can reduce loss of light.

A harness 334 can be positioned in a cavity 336 of the lightguide 306. In some implementations, the harness 334 includes electrical conductors that can extend to and/or from any of multiple circuit boards that may be included in the light source 304 and/or 318. For example, the lightguide 306 can hold the harness 334 using the cavity 336 to facilitate the electrical conductors linking to/from one circuit board.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A rear combination lamp for a vehicle, the rear combination lamp comprising:
 a first housing member that is opaque;
 a first light source inside the first housing member;
 a first lightguide abutting the first housing member and enclosing the first light source, a first taillight portion extending from the first lightguide;

a structural member that is opaque and abuts the first lightguide on an opposite side from the first housing member;

a second lightguide abutting the structural member on an opposite side from the first lightguide, a second taillight portion extending from the second lightguide;

a second housing member that is opaque and that abuts the second lightguide on an opposite side from the structural member; and a second light source inside the second housing member, wherein the second lightguide encloses the second light source;

wherein the rear combination lamp forms a stack of components having a rearward joint and a forward joint, and wherein the rearward joint comprises the first housing member, the first lightguide, the structural member, the second lightguide, and the second housing member forming a first seal.

2. The rear combination lamp of claim 1, wherein each of the first and second taillight portions extends rearward on the vehicle from the first and second housing members.

3. The rear combination lamp of claim 2, wherein the first housing member, the first light source, the first lightguide, the structural member, the second lightguide, the second light source, and the second housing member are assembled substantially along a z-direction of a vehicle coordinate system.

4. The rear combination lamp of claim 1, wherein the forward joint comprises the first housing member, the first lightguide, the structural member, the second lightguide, and the second housing member forming a second seal.

5. The rear combination lamp of claim 1, wherein the first lightguide includes an elevated portion adjacent the first light source.

6. The rear combination lamp of claim 5, wherein the structural member includes a shape supporting the elevated portion.

7. The rear combination lamp of claim 5, wherein the elevated portion comprises a light collimator.

8. The rear combination lamp of claim 7, wherein the first lightguide further includes an outer surface forming about a 45-degree angle with the first light source and with the first taillight portion.

9. The rear combination lamp of claim 1, wherein the second lightguide includes an elevated portion adjacent the second light source.

10. The rear combination lamp of claim 9, wherein the second lightguide further includes an outer surface forming about a 45-degree angle with the second light source and with the second taillight portion.

11. The rear combination lamp of claim 9, wherein the second lightguide further includes a portion extending from the elevated portion in an opposite direction from the second taillight portion, the portion being thinner than the elevated portion and the second taillight portion.

12. The rear combination lamp of claim 1, wherein each of the first and second light sources includes a light-emitting diode.

13. The rear combination lamp of claim 1, wherein at a rear of the vehicle, only the first and second taillight portions, and a portion of the structural member, extend past vehicle trim, wherein the portion of the structural member is positioned between the first and second taillight portions.

14. The rear combination lamp of claim 1, wherein the rear combination lamp is a full-size taillight extending from side to side of the vehicle, and wherein the first lightguide extends along an entire length of the full-size taillight.

15. The rear combination lamp of claim 1, wherein the first lightguide further defines a cavity, wherein the rear combination lamp further comprises a harness of electrical conductors for at least one of the first light source or the second light source, and wherein the harness is positioned in the cavity.

16. A rear combination lamp for a vehicle, the rear combination lamp comprising:

a first housing member that is opaque;

a first light source inside the first housing member;

a first lightguide abutting the first housing member and enclosing the first light source, a first taillight portion extending from the first lightguide;

a structural member that is opaque and abuts the first lightguide on an opposite side from the first housing member;

a second lightguide abutting the structural member on an opposite side from the first lightguide, a second taillight portion extending from the second lightguide;

a second housing member that is opaque and that abuts the second lightguide on an opposite side from the structural member; and a second light source inside the second housing member, wherein the second lightguide encloses the second light source;

wherein the rear combination lamp is a full-size taillight extending from side to side of the vehicle, and wherein the first lightguide extends along an entire length of the full-size taillight.

17. The rear combination lamp of claim 16, wherein the first lightguide is a taillight and a brake light for the vehicle.

18. The rear combination lamp of claim 16, wherein the second lightguide extends along only part of the entire length of the full-size taillight.

19. The rear combination lamp of claim 16, wherein the second lightguide is a turn signal light for the vehicle.

20. The rear combination lamp of claim 16, wherein the rear combination lamp forms a stack of components having a rearward joint and a forward joint, and wherein the rearward joint comprises the first housing member, the first lightguide, the structural member, the second lightguide, and the second housing member forming a first seal.

* * * * *